United States Patent
Geeng

(10) Patent No.: US 7,212,471 B2
(45) Date of Patent: May 1, 2007

(54) METHOD FOR OPERATING THE TRAY OF AN OPTICAL DISK SYSTEM

(75) Inventor: Shyh-Dar Geeng, Taipei Hsien (TW)

(73) Assignee: iDOT Computers, Inc., Taipei (TW)

( * ) Notice: Subject to any disclaimer, the term of this patent is extended or adjusted under 35 U.S.C. 154(b) by 762 days.

(21) Appl. No.: 10/605,564

(22) Filed: Oct. 9, 2003

(65) Prior Publication Data

US 2004/0105353 A1    Jun. 3, 2004

(30) Foreign Application Priority Data

Oct. 9, 2002    (TW) .............................. 91123312 A

(51) Int. Cl.
    *G11B 7/085*    (2006.01)
(52) U.S. Cl. .............................. 369/30.36; 369/30.27; 369/30.06
(58) Field of Classification Search ............. 369/30.36, 369/30.04–30.09, 30.27, 30.24, 47.33, 53.2, 369/53.36, 47.32, 30.2, 53.31; 386/126, 386/125, 95; 710/10, 11, 14
    See application file for complete search history.

(56) References Cited

U.S. PATENT DOCUMENTS 6,172,948 B1 *  1/2001  Keller et al. .................. 369/83
6,621,768 B1 *  9/2003  Keller et al. .............. 369/30.05
6,757,229 B2 *  6/2004  Izawa ....................... 369/47.33

FOREIGN PATENT DOCUMENTS

CN        2514460 Y        10/2002

* cited by examiner

*Primary Examiner*—Ali Neyzari
(74) *Attorney, Agent, or Firm*—Jiang Chyun IP Office

(57) ABSTRACT

A method is for simultaneously operating the tray of an optical disk system and the front panel of the computer cabinet wherein the optical disk system is housed. In the method, the tray of the optical disk system is ejected immediately after the front panel of the computer case is completely opened when a tray operation instruction is issued and the front panel is currently at a close state. Additionally, the tray is retracted into the optical disk system before the front panel of the computer case is closed when a tray operation instruction is issued again and the front panel is currently at an open state so that the optical disk system may been closed inside a computer cabinet of the computer including HI-FI stereo. In the embodiment, the tray operation instruction is delivered via an output pin of the computer including HI-FI stereo and one of the reserved output pin of the optical disk system.

9 Claims, 2 Drawing Sheets

METHOD FOR OPERATING THE TRAY OF AN OPTICAL DISK SYSTEM

CROSS REFERENCE TO RELATED APPLICATIONS

This application claims the priority benefit of Taiwan application serial no. 91123312, filed Oct. 9, 2002.

BACKGROUND OF INVENTION

1. Field of Invention

The present invention generally relates to an optical disk system, and more particularly, to a method for simultaneously operating the tray of an optical disk system and the front panel of the computer case where the optical disk system is housed.

2. Description of Related Art

In line with the technological advancement, the computer has become an absolute necessity of modern lives, for example, a truth is that computers take a position getting more and more important in peoples daily works and family lives.

Computer hardware has had great advancement in computing speed and data processing power recently. Nowadays, computers have treated as a widely used multimedia AV equipment with the helps of the technology advancements regarding the field of optical disk systems used for data storage media. However, although modern computers have performance no worse than that of the legacy mainframe systems, which still offers unsatisfied AV effects due to their limited architecture. Although many engineers have offered lots of developments in sound cards and make their designs being more powerful than before. However, any listener cannot be satisfied with the playing AV effects offered by the modern computer system since the playing ones are far less than that of a 5.1 channel audio system. On the other hand, the commonly used cabinets of the conventional computer systems contain fixed front panel and any housed peripheral device such as a CD-ROM drive may expose its front panel to facilitate the tray movements. The computer cabinet cannot be designed with more aesthetically appealing modeling, which makes the appearances of the conventional computer systems far away from a commonly used stereo system.

Furthermore, it is significant a time-costly way for employing a general-purpose computer used as an AV stereo system because the general-purpose computer system cannot play AV data until computer operating system such as the commonly used Windows system being started up completely. Customers" patients are seriously challenged since they must cost a long time to wait for the prolonged procedure while booting the operating system. Moreover, since the optical disk system inside the computer demands a space for ejecting its tray, the modeling design of the computer cabinet is impacted. This is a disadvantage when designing a computer including HI-FI stereo with an aesthetically appealing cabinet.

SUMMARY OF INVENTION

To solve the above problem, the present invention provides a method for operating the tray of an optical disk system, where the tray may be normally operated even if the optical disk system is enclosed inside the computer cabinet completely. Therefore, it is possible to design a computer including HI-FI stereo with aesthetically appealing.

In one embodiment, the operation method comprises the steps as follows. Firstly, if the tray operation instruction is issued, the state of the front panel of the computer cabinet is detected. The front panel of the computer cabinet is actuated to open, and then the tray state of the optical disk system is detected if the front panel of the computer cabinet is not in the open state. If the tray of the optical disk system is not in the ejective state, a tray ejective operation is perform to make the tray being moved out of the optical disk system. If the tray of the optical disk system is in the ejective state, a retract operation is performed to make the tray being moved into the optical disk system and then the front panel of the computer cabinet is closed to enclose the optical disk system again.

In the preferred embodiment of the present invention, the optical disk system is an optical disk drive such as a CD-ROM, drive, a DVD ROM drive, a DVD ROM+CDRW drive, or the like. The instruction associated with tray operations is issued when a tray ejection/retraction button on the computer cabinet is pressed or related command for controlling tray operations is given from the computer unit.

In the embodiment, a pin originally used for receiving the playback instruction of the optical disk system is employed to detect whether the front panel of the computer cabinet is open or not. A reserved output pin such as an AGIN pin of the optical disk system is used to activate the operation of opening or closing the front panel of the computer cabinet.

In the embodiment, the disclosed method may detect whether the front panel of the computer cabinet is open or not before performing associated tray opening or closing operations such that the tray may be protected from damaged. Therefore, the computer cabinet can be designed with beautiful modeling since the optical disk system is completely enclosed into the computer cabinet.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
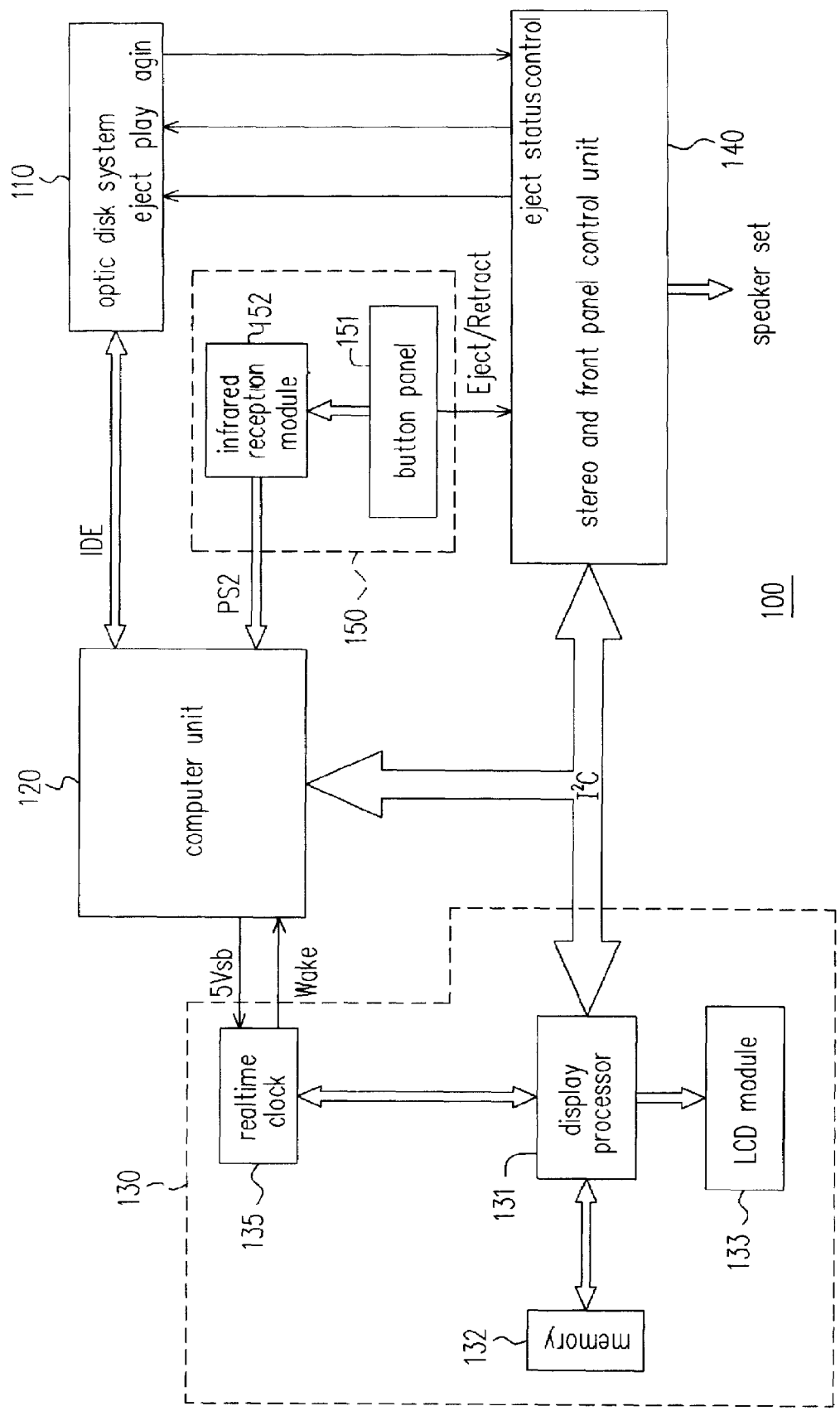
FIG. 1 schematically shows a block diagram of a computer including HI-FI stereo of a preferred embodiment according to the present invention.

FIG. 1 schematically shows a block diagram of a computer including HI-FI stereo of a preferred embodiment according to the present invention. The computer including HI-FI stereo 100 encompasses an optical disk system 110, a computer unit 120, a stereo and front panel control unit 140, and a display unit 130. In order to make the computer including HI-FI stereo 100 being easily controlled by a customer, the computer including HI-FI stereo 100 further includes an input unit 150. As shown in the diagram, the computer 120 is a central control unit of the computer including HI-FI stereo 100, which is coupled to the optical disk system 110, the input unit 150, the stereo and front panel control unit 140, and the display unit 130 via buses such as IDE, PS2 and IIC, respectively.

The optical disk system 110 is an optical disk drive such as a CD-ROM drive, a DVD ROM drive, a DVD ROM+ CDRW drive, or the like that may access or store computer data or AV data from/into an optical disc. Therefore, the optical disk system 110 may access computer data from associated optical disk when the computer including HI-FI stereo 100 is used as a general-purpose computer. On the other hand, the computer including HI-FI stereo 100 may play the AV data when the computer including HI-FI stereo 100 is selected as a HI-FI stereo.

The computer unit 120 may include devices such as computer main board, keyboard, mouse and display screen. Furthermore, the computer unit 120 may access the computer data or AV data required for subsequent operations stored on the storage media 110. In the embodiment, the computer unit 120 further comprises a Basic Input Output System (abbreviated as BIOS) with optional functions. A menu embedded in the BIOS is displayed on a screen of the display system when the computer including HI-FI stereo 100 is just powered on, so that a user may select the computer including HI-FI stereo 100 as a general-purpose computer or as a HI-FI stereo according to selections shown on the menu. Accordingly, when the user selects to use the HI-FI stereo function, the BIOS by-passes the routine procedure for activating an operating system used for the computer unit 120 and executes a playback control program included in the BIOS to immediately play the AV data. Any ordinary person skilled in the art knows that any operating system is not actuated until the POST (Power On Self Test), partition and boot procedures completed run. Time-cost is significantly degraded in the disclosed method since the operating system is by-passed.

As shown in the diagram, the display unit 130 comprises a memory 132, a display processor 131, a LCD module 133 and a real-time clock 135. The memory 132 is used to store display images or the image files regarding the statuses of playing AV data, e.g. the current playing volume. Therefore the display processor 131 may access the stored display images or image files from the computer unit 120 according to the scanning code, while the accessed display images or the image files are then transferred to the LCD module 133 for displaying purpose. Moreover, the back light emitting color of the LCD module 133 is controllable so as to provide more colorful display interfaces.

Furthermore, the real-time clock 135 in the display unit 130 receives a synchronization alignment operation from the BIOS of the computer unit 120 when it is just powered on, while the power of the real-time clock 135 is provided by the standby power 5 Vsb of the computer unit 120. Accordingly, the real-time clock 135 may provide a real-time clock message even when the computer including HI-FI stereo 100 is powered off. Besides providing the real-time clock message, the computer including HI-FI stereo 100 also allows a default power on time to be set as users requirements. Therefore, the display unit 130 issues a wakeup message via a communication line of a WOL connector coupled to the computer unit 120 to perform associated power on operation.

The stereo unit 140 is used to receive the AV data delivered from the computer unit 120 and then plays HI-FI stereo music sound from an audio system such as a speaker set after the AV data is converted. When the computer including HI-FI stereo 100 is selected to be used as a HI-FI stereo, in addition to using the mouse of the computer unit 120 to operate the stereo, the button panel 151 or the infrared reception module 152 of the input unit 150 may be used to accept the stereo operation instructions that are issued when users press the button or the remote controller. Therefore the computer unit 120 may perform HI-FI stereo operation instructions such as play/pause, forward, backward, stop, volume up, volume down, mute and tray ejection/extraction in response to the stereo operation instructions.

As described above, in order to design the computer including HI-FI stereo 100 with a beautifully modeled cabinet, the optical disk drive 110 is designed to hide behind the front panel of the cabinet of the computer including HI-FI stereo 100. In other words, the tray of the optical disk system 110 is located behind the front panel, thus the tray cannot be ejected until the front panel is open to provide more free space to facilitate the optical disk system 110 to move in and out the tray. The application with the same Applicant as the present invention entitled "COMPUTER CASE WITH SLIDING PANEL" discloses a computer case having a sliding panel that can be electrically driven. Furthermore, another application with the same Applicant as the present invention entitled "COMPUTER INCLUDING HI-FI STEREO" discloses a computer system is set to integrate both of the general-purpose computer and HI-FI stereo together. Additionally, another application with the same Applicant as the present invention entitled "STEREO SPEAKER" discloses a speaker set for creating sound circularly.

Therefore, when the tray ejection/retraction button on the button panel 151 is pressed, a message indicative of this eject/retract button being pressed via an ejection/retraction transmission line. The stereo and front panel control unit 140 receives this pressed message and then sends a pulse with a pulse width 30 ms~40 ms to the optical disk system 110 via their coupled eject pins. A controller (not shown in the diagram) of the optical disk system 110 detects if the front panel is open or not via a play pin coupled to a status pin of the stereo and front panel control unit 140 after the controller receives this tray operation instruction. If the front panel is not open yet, an operation control signal for opening the front panel is issued to open the front panel via an AGIN reserved output pin connected to a control pin of the stereo and front panel control unit 140. Afterwards, the tray operates in response to the tray status of the optical disk system 110. That is, the optical disk system ejects its tray when the tray is not in the ejective state, otherwise, the tray is retracted and an operation control signal indicative of closing the front panel is issued via the AGIN reserved output pin to actuate associated panel closing operation. Additionally, a sensing device for detecting the current position of the front panel may be installed for monitoring purpose in order to prevent any jamming while the disk holdertray is moving.

Moreover, when a mouse or keyboard is used to operate the optical disk system 110, the optical disk system 110 accepts the tray operation instruction issued by the computer unit 120 via an IDE bus coupled to the computer unit 120. Meanwhile, the operation method is the same as the above-mentioned except that different reception source for the tray operation instruction is employed.

Figure 2:
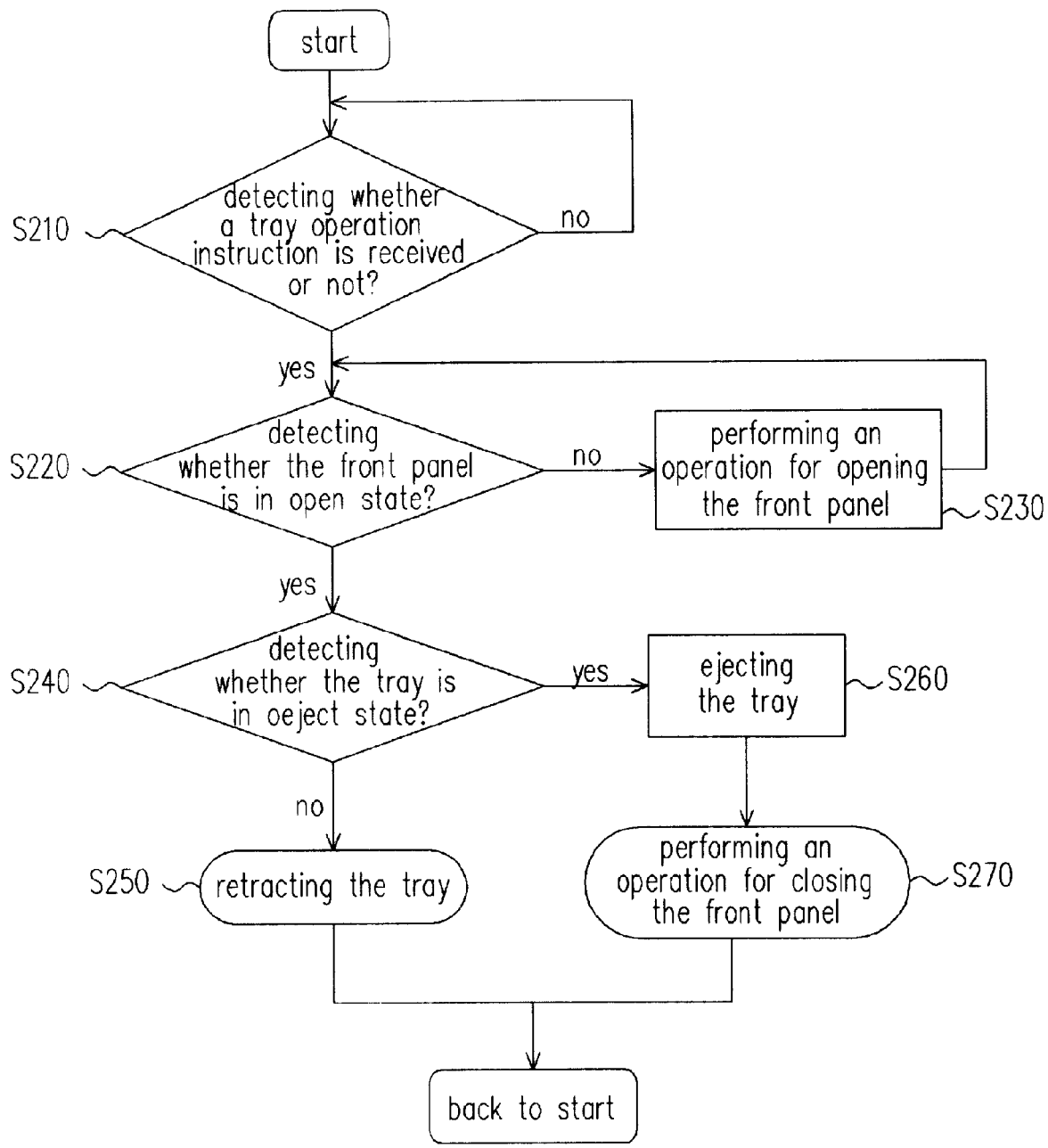
FIG. 2 schematically shows a flow chart of a method for operating the tray of the optical disk system of the preferred embodiment according to the present invention.

FIG. 2 schematically shows a flow chart for operating the tray of the optical disk system according to the preferred embodiment. The disclosed method encompasses the steps as follows. Firstly, a tray operation instruction is detected at step S210. If the tray operation instruction is received, the front panel of the computer cabinet is detected at an open state or not at step S220. If the front panel of the computer cabinet is not open, an operation for opening the front panel of the computer cabinet is actuated at step S230, while the tray of the optical disk system is detected to be at an ejective state or not at step S240. If the tray of the optical disk system is not in the ejective state, an operation for moving the tray out of the optical disk system is then performed at step S250. If the tray of the optical disk system is at the ejective state, an operation for retracting the tray into the optical disk system is then performed at step S260. Finally, an operation for closing the front panel of the computer cabinet is actuated to enclose the optical disk system inside the computer cabinet. Obviously, any control mechanism such as a button tray ejection/retraction button on the computer cabinet may be used to control the operations of both the tray of the optical disk system and the front panel of the computer case where the optical disk system is housed simultaneously.

In summary, the present invention at least comprises following advantages.
1. A computer including HI-FI stereo that integrates the general-purpose computer and HI-FI stereo functions is disclosed in the embodiment such that a user may select one of the integrated functions as requirements.
2. The disclosed method provides an approach to make the optical disk system being enclosed inside the computer cabinet, so that the computer cabinet can be designed with aesthetically appealing modeling.
3. The movements of both the tray of optical disk system and the front panel of the computer case where the optical disk system is housed may be simultaneously controlled under a unique control mechanism such as a button mounted on the computer case. Therefore, if the control mechanism is activated, the tray of the optical disk system may be ejected after the front panel of the computer case is open. Thereafter, if the control mechanism is activated again, the tray may be retracted into the optical disk system firstly and then the front panel is closed to enclose the optical disk system inside the computer case completely.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A method for operating a tray of an optical disk system housed in a computer including HI-FI stereo, the method comprising the steps of:
    ejecting the tray from the optical disk system after a front panel of a computer case is open when a tray operation instruction is issued and the front panel is detected at a close state; and
    retracting the tray into the optical disk system before the front panel of the computer case is closed when another tray operation instruction is issued again and the front panel is detected at an open state so that the optical disk system is enclosed inside a computer cabinet of the computer including HI-FI stereo.

2. The method of claim 1, wherein the tray operation instructions are delivered via an output pin of the computer including HI-FI stereo and an output pin of the optical disk system, wherein the output pin of the computer including HI-FI stereo and the output pin of the optical disk system are coupled.

3. The method for operating the tray of an optical disk system of claim 2, wherein the output pin of the optical disk system is one of reserved output pins of the optical disk system.

4. The method of claim 1, wherein the optical disk system is a CD-ROM drive, a DVD ROM drive, or a DVD ROM+CDRW drive.

5. The method of claim 1, further comprising a sensing device for detecting a current position of the front panel of the computer case while the tray of the optical disk system is moving.

6. A method for operating a tray of an optical disk system housed in a computer including HI-FI stereo, the method comprising the steps of:
    ejecting the tray from the optical disk system after a front panel of a computer case is open when a tray operation instruction is issued and the front panel is detected at a close state, wherein the tray operation instruction is delivered via an output pin of the computer including HI-FI stereo and an output pin of the optical disk system, and the output pin of the computer including HI-FI stereo and the output pin of the optical disk system are coupled; and
    retracting the tray into the optical disk system before the front panel of the computer case is closed when another tray operation instruction is issued again and the front panel is detected at an open state so that the optical disk system is enclosed inside a computer cabinet of the computer including HI-FI stereo.

7. The method of claim 6, wherein the output pin of the optical disk system is one of reserved output pins of the optical disk system.

8. The method of claim 6, wherein the optical disk system is a CD-ROM drive, a DVD ROM drive, or a DVD ROM+CDRW drive.

9. The method of claim 6, further comprising a sensing device for detecting a current position of the front panel of the computer case while the tray of the optical disk system is moving.

* * * * *